United States Patent [19]
Hornung et al.

[11] Patent Number: 5,417,491
[45] Date of Patent: May 23, 1995

[54] APPARATUS FOR DISSOLVING DRY MATERIAL INTO SOLUTION AND INJECTING THE SAME INTO AN IRRIGATION SYSTEM

[76] Inventors: Craig S. Hornung; Charles J. Hornung, both of 3710 S. Woodland, Visalia, Calif. 93277

[21] Appl. No.: 237,158
[22] Filed: May 3, 1994
[51] Int. Cl.6 .............................................. G01F 15/02
[52] U.S. Cl. .................................... 366/134; 366/191; 366/194; 366/168.1; 366/177.1; 222/67; 222/68
[58] Field of Search ................... 366/131, 134, 27, 28, 366/153, 167, 168, 177, 182, 42, 51, 184, 190, 191, 194, 195, 196; 222/67, 68

[56] References Cited
U.S. PATENT DOCUMENTS

| | | |
|---|---|---|
| 3,240,476 | 3/1966 | McVey ............................... 366/194 |
| 3,282,468 | 11/1966 | Karlen ............................... 122/67 |
| 4,415,267 | 11/1983 | Hill ..................................... 366/51 |
| 4,820,053 | 4/1989 | Rivers ............................... 366/137 |
| 5,340,213 | 8/1994 | Rumph ............................. 366/196 |

Primary Examiner—Robert W. Jenkins
Attorney, Agent, or Firm—Dennis B. Haase

[57] ABSTRACT

The present invention represents an improvement in state of the art apparatus for injecting controlled amounts of a soil amendment, including fertilizers, into an irrigation system, by first effecting the batch mixing of a selected soil amendment, in the form of a particulate material in a fluid medium, such that the particulate material is either dissolved or suspended in the fluid medium to form a slurry, continuously locating an area within the mixing tank in which the admixture displays the greatest, or optimum homogeneity, and continuously withdrawing metered amounts of the resultant slurry for injection into an irrigation system over the entire period of the irrigation cycle.

25 Claims, 3 Drawing Sheets

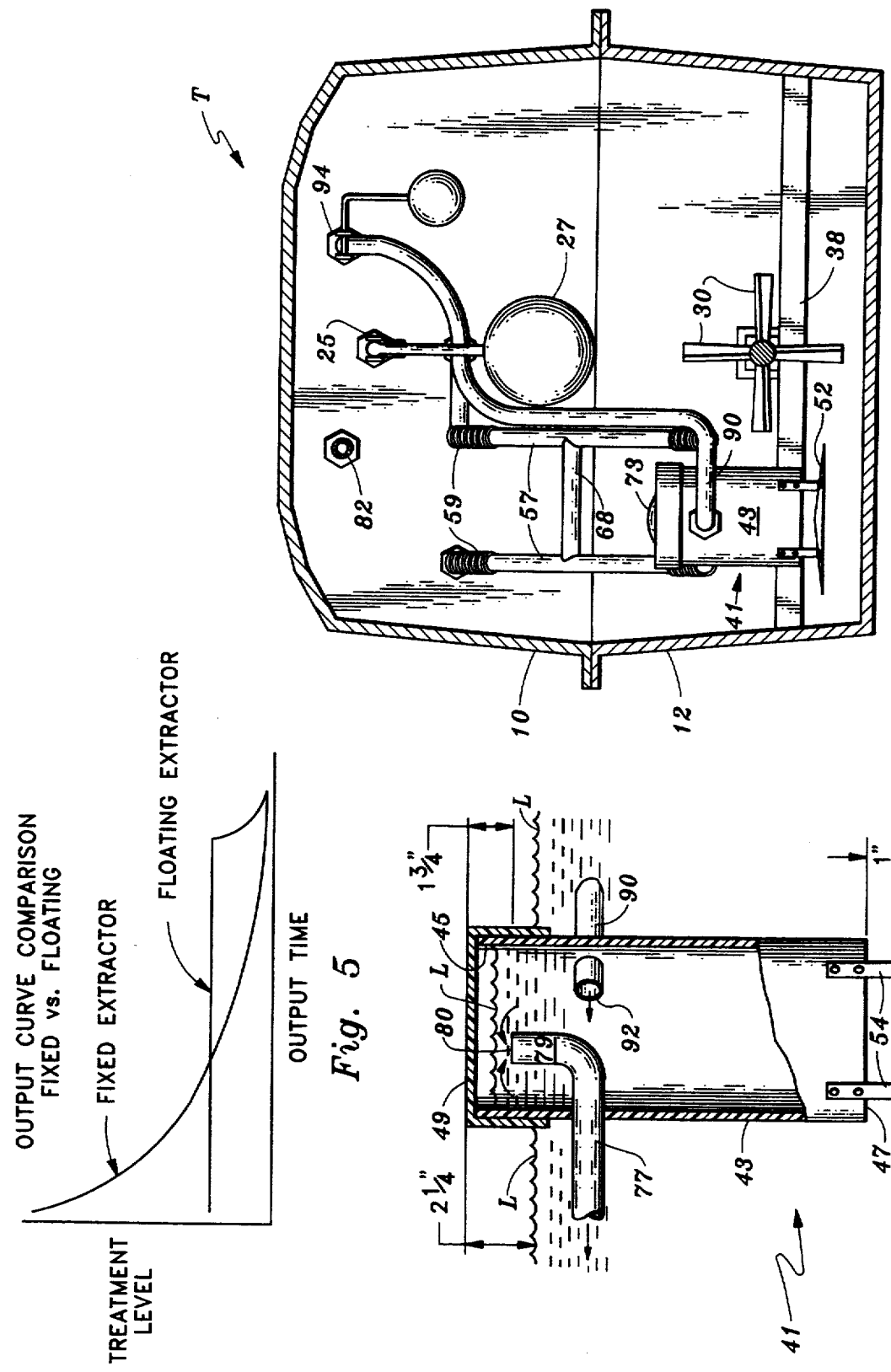

APPARATUS FOR DISSOLVING DRY MATERIAL INTO SOLUTION AND INJECTING THE SAME INTO AN IRRIGATION SYSTEM

The present invention relates, generally, to improvement in apparatus for dissolving dry materials into solution, and the timed injection of the resultant slurry into a liquid stream. More specifically, the invention is intended to effect dissolution of dry soil amendments into a slurry for timed injection into an irrigation system to provide uniform application of such amendments over a parcel of land.

BACKGROUND OF THE INVENTION

1. Field of the Invention

There are a plethora of products which are packaged in dry particulate form, even though a more efficient state for use may be liquid. The risk of spills requiring cleanup and disposal is reduced, and any spill of dry is cleaned up easily. Dry matter is simply more easily stored and handled, and in dry form, the user is not required to handle the weight of, or pay for, the addition of liquids, such as water.

Many dry products are not readily liquid or water soluble, and in such products, maintenance of a proper concentration during dispensing of the resultant slurry creates additional problems.

In the area of soil amendments, and particularly such amendments as gypsum, potassium, sulfate, ammonium sulfate and some fertilizers, systemic herbicides, and pesticides, the problems are sufficiently complex that manual mixing and application has become the norm, even though many of such products are more efficiently applied by injection into an irrigation system.

As in other methods of application, irrigation systems differ in both their theory and application. Perhaps the most familiar system in current use is the sprinkler systems, which are similar to residential lawn sprinklers, and rely on timing to lay down a specific volume of water, commonly expressed in terms of acre feet/acre or acre inches/acre as applied.

Also in use, because of its simplicity for a particular application, is flood, or furrow application, wherein a particular parcel is leveled so as to provide a decrease in elevation away from the source of irrigation water. Small dikes are provided to retain the water until it can be absorbed, Thus, when the water is turned on the water flows away from the source and floods the parcel.

In certain row crops, furrow irrigation is employed. Similar to flood irrigation, a peripheral canal is flooded with water, and syphon tubes are used to interconnect successive rows of furrows with the canal to flood them.

Particularly in the more arid planes of the western states, where water is often at a premium, many agriculturalists have, as a means of water conservation, installed drip irrigation equipment, which delivers a proper amount of water directly to the base of the plant. Such a system does not work in all cases, but is effective in tree and vine cultivation.

If, as is the underlying philosophy of the present invention, soil amendments are best applied by injection into the irrigation system, in order that they might be carried into the soil with irrigation water, then the vexing problem to be addressed is how best to get the requisite soil amendment into the irrigation system which services the land to be treated. It is this question which the present invention addresses.

2. Overview of the Prior Art

The present invention is an improvement on the apparatus of Rivers U.S. Pat. No. 4,820,053, issued Apr. 11, 1989. While Rivers is more specific to the dissolution of gypsum as a soil amendment, the present invention is not so limited. However, Rivers was first to recognize, and then solve, the difficult problem of creating an admixture of gypsum, a substance which is recognized as extremely difficult to dissolve and to retain in a suspended state as a slurry. Rivers also recognized the difficulty of removing the resultant slurry while retaining its properties as mixed, by creating a quiescent zone from which slurry could be drawn without disturbing the delicate balance of the solution.

However, Rivers provides a system in which, by its very nature, the concentration of gypsum tends to decrease as a function of time. As a result, the user is constantly adding both the particulate gypsum and water during the irrigation cycle.

The present invention, on the other hand, provides a unique system to maintain concentration level relatively constant, which is a distinct advantage, if not an absolute necessity, in flood irrigation systems, for example.

A significant aspect of the present invention rests in the capability of the apparatus to extract, for injection into an irrigation stream, or the like, a measured amount of slurry at all times, and one aspect of the invention which assists in providing the requisite consistency is the ability of the apparatus to raise and lower the extractor during use in order to draw slurry, which is at a predetermined and constant ratio of additive to fluid. A search disclosed no device which accomplishes the foregoing in substantially the same way. Indeed, Wheaton U.S. Pat. No. 4,781,894, which is in a different field of endeavor altogether, is representative of the art currently available.

SUMMARY OF THE INVENTION

In its broadest sense, the present invention is intended to provide an improved means of delivery of particulate material to a designated locale, by dissolution of the material in a fluid medium, and deliver the resultant slurry in a consistent concentration over the entire period of delivery.

It is a primary objective, therefore, of the present invention to provide means for the dissolution of particulate material in a fluid medium such that a uniform admixture of the resultant slurry may be injected into a stream of water for distribution over any area to be irrigated.

More specifically, the present invention provides to the nation's farmers an efficient means of applying soil amendments, normally sold in particulate form, through the vehicle of existing flood or furrow irrigation systems.

Accordingly, it is an objective of the present invention to provide an improved apparatus for the controlled dissolution of dry particulate products, in a fluid medium such as water, and to permit continuous withdrawal of a uniform mixture of the dry product and fluid medium for injection into the irrigation system during the irrigation cycle.

Another, and closely related, objective of this invention is to provide means for batch mixing of a slurry comprised of a particulate product dissolved in a fluid medium, such that a uniform admixture can be dispersed over a given time period.

The source of water for most irrigation systems is relatively remote from the hub of farm activity. An understanding of this reality enhances the value of the apparatus of the present invention in that once charged and calibrated, it is self sustaining for the entire irrigation cycle, in that the entire batch of admixture is evenly distributed throughout the irrigation cycle, and no recharging, or resetting of the control parameters is required. The savings in time and effort is, likewise, significant.

In accomplishing the foregoing, as well as other objectives of the present invention, there is provided a quiescent zone from which slurry may be withdrawn over time, and such zone is moveable so as to be constantly positioned in an area of uniform admixture of the particulate and fluid medium, thereby permitting the withdrawal, over time, of a slurry of uniform saturation of the particulate material.

The foregoing, as well as other significant objectives and advantages of the present invention, will become evident from a study of the following detailed description of a preferred embodiment, taken in conjunction with illustrations which accompany this description, wherein:

DESCRIPTION OF THE DRAWINGS

With reference now to the drawings;

FIG. 5 illustrates a graph which compares the concentration of particulate matter in its slurry, relative to time during discharge, and comparing the output of the present invention relative to prior art devices;

FIG. 6 is a view of the extractor of the present invention, enlarged and partially cut away, to illustrate the relative position and function of the various elements that make up the extractor unit; and FIG. 7 is an end view of the tank, cut away to illustrate the relative position of several of the elements of the invention.

DETAILED DESCRIPTION OF A PREFERRED EMBODIMENT

Figure 1:
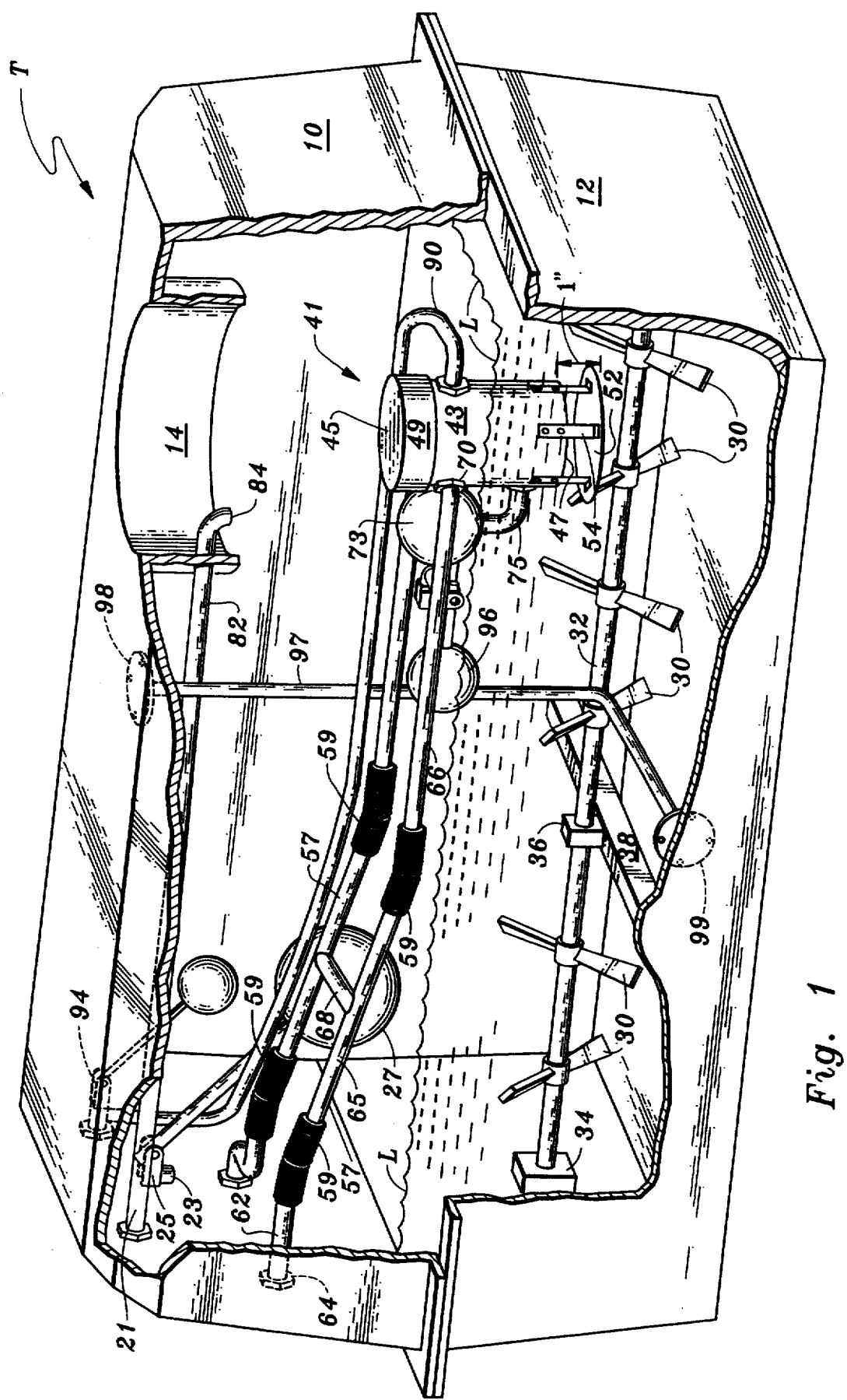
FIG. 1 is an illustration of the present invention, shown in perspective, and in the environment of the preferred embodiment.

With reference now to the accompanying drawings, and initially to FIG. 1, the present invention, which comprises a system for the dissolution of dry particulate material and metering of the resultant slurry into an irrigation stream, is illustrated in an environment wherein it has particular, although not exclusive, utility.

Specifically, a tank, or vessel, T is shown in FIG. 1, as having top and bottom sections 10 and 12 respectively, which are joined in any suitable well known manner. The tank T is fluid tight and is provided with a hatch 14, in the top section 10. A cover, or lid, is provided for, and tightly fits against the hatch 14, (not shown) in order to ensure the integrity of the contents of the tank during operation.

The tank T, which may assume any number of well known forms, is the receptacle for mixing and storage of an essentially homogenous slurry comprising a particulate material, such as gypsum, ammonium sulfate, potassium, sulfate and other fertilizer compounds, and a fluid medium, such as water, and dispensing therefrom the prepared slurry in a predetermined concentration, which by virtue of the unique construction of the invention, remains uniform over time. It should be appreciated that the apparatus of the present invention is equally effective with insolubles, such as limestone, which is retained in suspension during injection into the irrigation stream.

In order to charge the tank T with the soil amendment appropriate to the desired result, the tank is initially charged with- a carrier fluid, most typically water, although other fluids may be operative without departure from the invention. To this end, a fill tube 23 is located near the top of the tank T. The fill tube terminates in a downwardly projecting spout from which fluid is added to the tank T.

The fill tube 23 is connected to an external fluid source (not shown), and in order to control the fluid level in the tank T, and coincidentally create a measured supply of fluid, a float valve 25 is fitted in that portion of the fill tube disposed within the tank. The valve is set to cut off fluid to the tank T upon the float 27 being forced upwardly by the level of fluid until it reaches a preset height. It has been found that a tank capable of accommodating 550 gallons of fluid medium is adequate for most applications, and that volume will be used to illustrate one or more applications of the invention.

The tank T may be charged with the dry particulate matter to be used by pouring the same through the hatch 14. Once charged with fluid medium and the dry material to be blended therewith, all of the elements of the batch are in place, and, unlike predecessor devices, no additional dry material is added until it is time to recharge the tank for the next run. Thereafter, initial mixing is accomplished by an agitation and mixing system, including rotating, mixing paddles, 30.

As best seen in FIGS. 1 through 4, the paddies 30 are affixed to a drive shaft 32, which is longitudinally disposed near the bottom of the tank T, where the drive shaft 32 is mounted in sidewall bearings 34. Further support is provided by a centrally mounted bearing 36, secured to a rigid cross member 38.

One end of the drive shaft protrudes through the side wall of the tank T where it connects to any well known power source (not shown) so as to permit rotation of the drive shaft 32 at a predetermined speed.

The particulate matter introduced into the tank T is virtually always of a greater specific gravity than the fluid medium in the tank and will move to the bottom of the tank. The rotating paddles agitate the admixture, greatly assisting the dissolution of the particulate matter, if, indeed, it is soluble. If there are insolubles in the particulate matter, or if the solution becomes super saturated, on the other hand, the agitation will tend to cause the insoluble to be finely and evenly dispersed in the fluid medium. When mixed, the slurry occupies space in the tank, and has an upper fluid level L, which, of course, recedes as the tank is emptied.

A desirable characteristic of the apparatus of the present invention, is its ability to create a quiescent area, or zone, within the tank T, wherein a homogenous admixture of particulate and fluid medium can be found.

The essence of the apparatus of the present invention is its ability to vary the position of that zone so as to maintain a predetermined saturation ratio of particulate (whether or not dissolved) to fluid medium throughout the time required to empty the tank T. Accordingly, and for the first time, soil amendments of a known concentration can be mixed and injected into an irrigation system for even distribution to an area to be treated.

Once the tank T is charged, in order to achieve the goals set for the apparatus of the present invention, there is provided means for creating an area, or zone, near the upper fluid level L of the slurry within the tank T where the admixture of fluid and particulate are in a relatively quiescent state, protected from the agitation caused by the paddles 30. More particularly, an enclosure, or extractor, 41 is provided and, as illustrated, comprises a tubular member 43, which is vertically oriented in the tank T.

The member 43 has an opening 45 at the top, and a similar opening 47 at the bottom end thereof. The opening 45 is fitted with a closure, or cap, 49. At the lower, or bottom end, however, there is provided a deflector, in the form of a plate 52. The deflector may be of a conical shape, and of a diameter which exceeds the inside diameter of the bottom opening 47, as best seen in FIG. 5, and it is positioned relative to the lower opening 47, by means of spaced straps 54.

In order to prevent bubbles from reaching the interior of the extractor 41, and to otherwise inhibit disruption of the laminar flow conditions which are created inside the extractor tube 43, it has been determined that the deflector plate should be no less than ¾ inch from the opening 47, and no more than 1½ inches therefrom, and that for most applications, a spacing of 1 inch produces the best results.

In order to provide optimum results, the orientation of the extractor 41 should remain vertical. However, because the level of the slurry in the tank T recedes, or lowers, as slurry is drawn from the tank, the position of the extractor 41 cannot remain in essentially the same position relative to the slurry level in the tank, as is the case in other devices which are constantly being recharged.

In order to accomplish the objective of providing a uniform concentration of soil amendment for injection into an irrigation system throughout the injection process, the apparatus of the present invention adjusts the position of the extractor 41 as slurry is drawn from the tank, so that the point at which the slurry is drawn remains effectively the same throughout the process, thereby assuring that the concentration of the slurry remains consistent.

In order to permit the extractor 41 to float within the tank T, at the optimum position to accomplish the objectives outlined herein, the extractor is positioned in the tank by means of a flexible positioning member 57. In this case, two parallel members 57 are shown. Each such member works with other such members to both support and assist in continuously positioning the extractor 41 for optimum performance.

Each member comprises several distinct, but cooperative, sections, which sections are joined by means of expansible, flexible joint members 59. Each flexible joint member 59, as can be seen in FIG. 1, is capable not only of deviation along the longitudinal axis of the sections which it joins, but may expand and contract due to its bellows-like configuration, to permit the longitudinal axis of the extractor to remain substantially vertical.

Thus, a first section 62 is provided, which attaches to the wall of the tank as at 64. A mid-section member 65, attaches to the first section 62 by means of a joint member 59, and in turn, attaches to a third, transverse support section 66, again by means of a flexible joint member 59. In order to maintain proper spacing, coordinated operation, and, further, to provide structural integrity, a cross brace 68 is provided between the parallel mid-section members.

The support sections 66 attach, at their remote ends 70, to the opposed side walls of the extractor tube 43 and extend transverse to the longitudinal axis of the tubular member 43. Their respective forward ends attach, by means of flexible joint members 59, to the mid-section members, 65. This arrangement inhibits lateral movement of the extractor.

It will now be appreciated that as slurry is drawn from the tank, and the slurry level in the tank drops, the extractor is capable of moving with the fluid level, while remaining in a vertical orientation. In order to coordinate the movement of the extractor 41 with the receding slurry level in the tank, a float 73 is secured to the exterior of the side wall of the extractor tube 43 by means of a stem 75. The volume displaced by the float is, of course, sufficient to support the extractor, and any side loading that it might experience by virtue of the supports and other attachments, as will hereinafter appear.

Withdrawal of slurry for injection into an irrigation system is accomplished from within the extractor 41, since it is within the tubular member 43, that the admixture of fluid medium and particulate is both consistent and controllable. That area, which has been referred to as the quiescent zone, is protected from the agitation and possible entrapment of air, which is the natural consequence of the operation of the agitation system, and in some cases the reaction between the fluid medium and the particular dry material with which the tank T is charged.

Flow of slurry in the quiescent zone is upward, and laminar. Thus, by withdrawing slurry from the upper regions of the zone, the concentration of dissolved and suspended solids in the fluid medium is most consistent. Referring primarily to FIG. 6, a suction tube 77 is provided, which passes through the side wall of the tubular member 43, to a position close to the longitudinal axis of that member. The end of the suction tube 79 is turned upwardly to an orientation approximately parallel with the longitudinal axis and its terminus 80 being immediately below the level of slurry in the extractor. Thus, slurry is drawn into the suction tube 77 at a point which is as remote from the bottom opening 47 of the extractor as the practical constraints of construction permit, and that is the area of most consistent concentrations of the slurry.

The suction tube passes through the wall of the tank T, where it connects to a pump (not shown), preferably of constant displacement. The pump is connected, in any of several well known ways, to the irrigation system for injection of the slurry therein. It is beneficial to have the capacity to bypass the slurry and return it to the system when not injecting the material into the irrigation system, and, to that end, a bypass return line 82 is provided from the pump to the tank, which returns the slurry to the tank.

In a tank of the size illustrated, namely 600 gallons, it will accept 525 gallons of fluid, and have sufficient room to accommodate as much as 4,500 pounds of dry material, leaving some room at the top of the tank T.

Practical considerations dictate that the size of the pump be one having an output of, for example, of between 6.2 and 5.4 gallons per minute (gpm). Such a pump would exhaust the contents of the subject tank in approximately 100 minutes, and concentration per unit of irrigation water would be higher than desirable. Since an average irrigation cycle for flood, furrow and center pivot systems may range from 6 to 24 hours, and since it is an attribute of the present invention that a single charge will service a complete irrigation cycle, it is necessary to provide means for adjusting concentrations to accommodate flow.

The foregoing is accomplished, in accordance with the invention, by injecting a quantity of water into the extractor. Accordingly, a supplemental fluid line 90, at its discharge end 92, extends through the wall of the tubular member 43, with the other end thereof being connected to a supply of fluid under sufficient pressure to permit injection of a controlled quantity of fluid to the extractor.

By way of example, with 550 gallons of slurry, an irrigation cycle of 6 hours is readily accommodated and cost effective with a 600 gallon capacity tank fully charged, and using a pump having an output of 5.4 gpm, sufficient fluid must be added to the system to inject a constant concentration of slurry for 360 minutes, representing the duration of the irrigation cycles. That requires a volume of 1,944 gallons over the 6 hour time period. To provide that volume without effecting the concentration of the slurry, one must inject, into the extractor, 1,944 (gallons needed for the cycle)—550 (volume initially in the tank) or 1,394 gallons divided over 6 hours (360 minutes) or 3.87 gpm of injected fluid.

Appropriate controls for adjusting the volume of fluid medium injected are well know and readily available, and are not, therefore, illustrated or discussed in detail.

Figure 2:
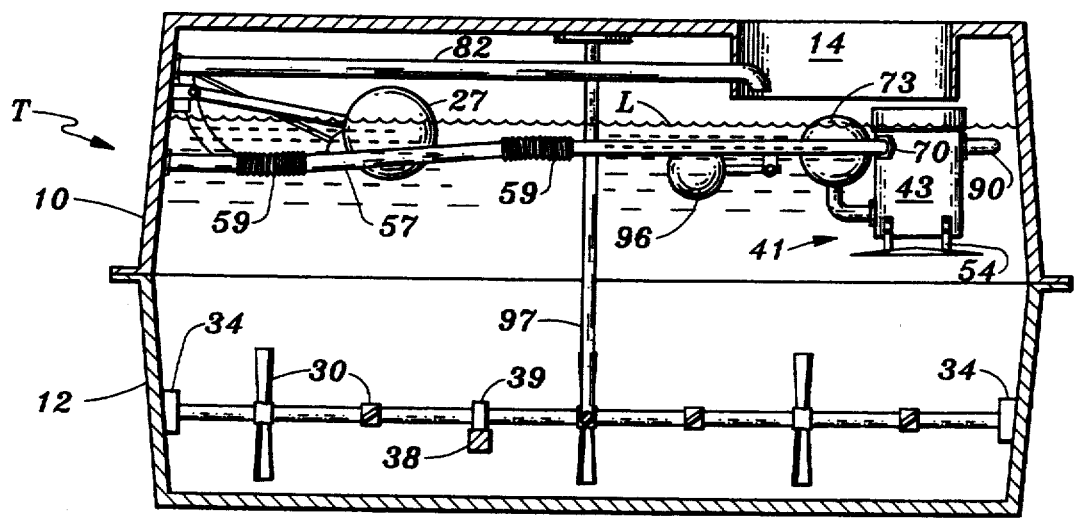
FIG. 2 is a side elevation, partially cut away, illustrating the relative position of the extractor and other elements of the present invention when the tank in which it is housed is in the fully charged position.
Figure 3:
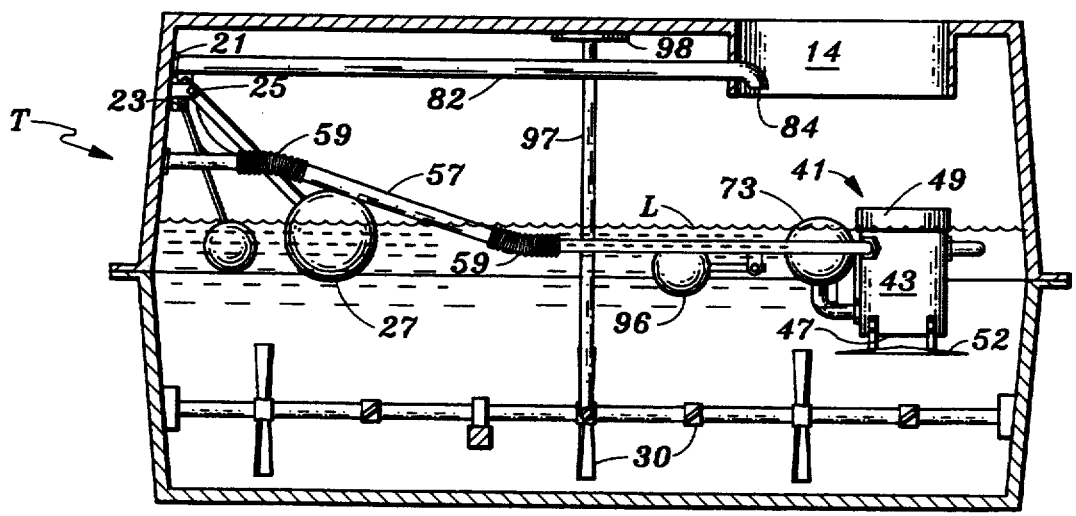
FIG. 3 is a view similar to FIG. 2, illustrating the relative position of the various elements of the invention with the tank in a partially discharged condition.
Figure 4:
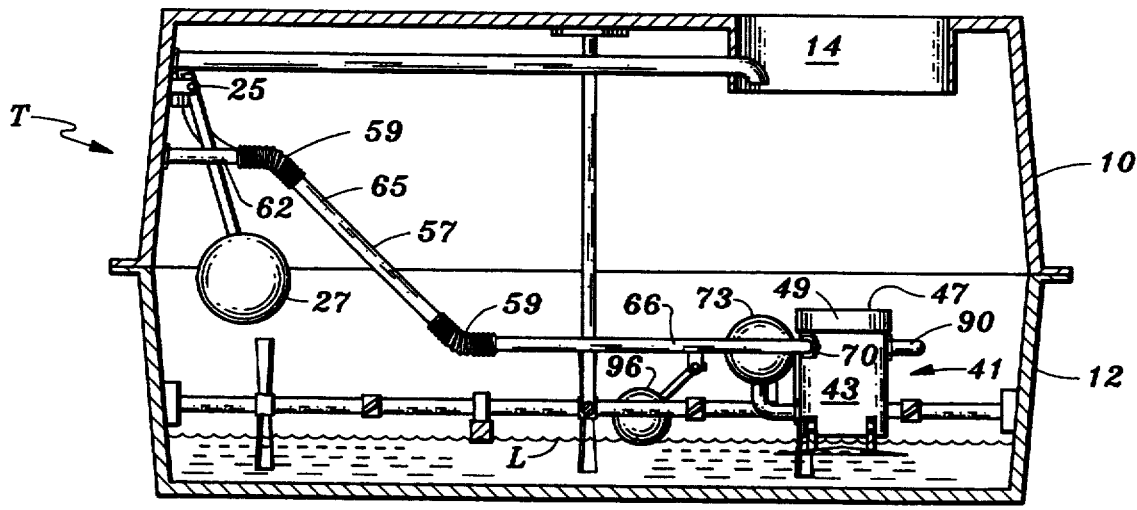
FIG. 4 is a view similar to that of FIGS. 2 and 3, illustrating the relative position of the various elements of the invention with the tank in its discharged condition.

With reference now to FIGS. 2, 3 and 4, the progression of an injection cycle is clearly illustrated. In FIG. 2, the tank T has been fully charged and is ready to begin its cycle. The float valve 25 has established the level of slurry in the tank, and a safety valve 94, also of the float variety, is located near the upper limit of the tank's capacity. The safety valve 94 will actuate to prevent overflow if the tank, because of a runaway supplemental fluid line failure, or for any other reason, becomes too full.

FIG. 3 illustrates the relative position of the various elements which make up the novel apparatus, with the tank partially discharged. It should be noted that the extractor remains in an essentially vertical posture throughout the process cycle.

FIG. 4 is illustrative of the relative position of the various elements of the invention at the point of practical exhaustion of the tank. Referring also to FIG. 7, it will be seen that the extractor 41 is offset from the centerline of the tank. In so doing, the extractor can move past the paddles toward the bottom of the tank, and thereby withdraw fluid to a point very near tank exhaustion. In order to insure that the extractor 41 does not inadvertently move into the paddles, a safety bar 97 attaches to the top of the tank, at 98, and to one side thereof at 99, to bracket in the extractor and prevent its movement into the paddles.

A cutoff valve, in the form of a float valve 96, as illustrated, senses the bottom of the tank, or any other stop point which may be desirable, and signals the arrival of the extractor mechanism at that point at, which time adds water to the system, thereby saving the pump from running dry and possibly burning up.

FIG. 5 illustrates graphically the differences between existing fixed extractors and the floating extractor of the present invention, and the unabashed difference is plain. The present invention provides the kind of controlled and constant output that is necessary to the effective operation of flood, furrow and center pivot irrigation systems and, unlike its predecessors, can provide the kind of consistent results that permit uniform concentrations of soil amendments to be applied evenly over the entire area to be irrigated.

Having thus described a preferred embodiment of the present invention, what is claimed is:

1. In a system for combining a particulate substance and a fluid medium, and injecting the resultant essentially homogenous slurry into water used for irrigation purposes, comprising, in combination:
    a tank; said tank defining a mixing chamber, said tank being charged with a predetermined amount of particulate material, and a fluid medium;
    a centrally disposed agitator in said chamber for mixing said material and said fluid medium to form an essentially homogenous slurry, said slurry filling said tank to an upper fluid level;
    means defining a quiescent zone in said chamber, said quiescent zone disposed toward the upper level of slurry in said chamber, and being filled with said slurry;
    means for continuously removing a measured amount of said slurry from said quiescent zone;
    said quiescent zone being moveable with said upper fluid level as said slurry is removed from said chamber.

2. The apparatus as set forth in claim 1, wherein said quiescent zone remains in the same position relative to said upper fluid level as said upper fluid level recedes.

3. The apparatus as set forth in claim 2, with said quiescent zone being located to one side of the longitudinal axis of said chamber.

4. The apparatus as set forth in claim 2, wherein said means defining a quiescent zone comprises an extractor; said extractor defining an enclosure having an opening at one end thereof such that said slurry fills the greater portion of said extractor.

5. The apparatus as set forth in claim 1, wherein said quiescent zone is movable in a substantially vertical plane in said chamber.

6. The apparatus as set forth in claim 5, wherein said means defining a quiescent zone comprises an extractor; said extractor defining an enclosure having an opening at one end thereof such that said slurry fills the greater portion of said extractor.

7. The apparatus as set forth in claim 1, wherein said means defining a quiescent zone comprises an extractor; said extractor defining an enclosure having an opening at one end thereof such that said slurry fills the greater portion of said extractor.

8. The apparatus as set forth in claim 7, wherein said extractor has a longitudinal axis and said longitudinal axis remains substantially vertical during removal of slurry from said chamber.

9. The apparatus as set forth in claim 8, said longitudinal positioning member comprising relatively rigid sections; flexible, expansible joints interconnecting said sections so as to permit limited substantially vertical movement of said extractor, whereby the longitudinal axis of said extractor remains substantially level.

10. The apparatus as set forth in claim 7, with the lower end of said extractor being open, a deflector disposed below the opening at said lower end of the extractor.

11. The apparatus as set forth in claim 10, with said deflector plate being disposed between $\frac{3}{4}$ inch and $1\frac{1}{2}$ inches from said opening.

12. The apparatus as set forth in claim 10, with said deflector being disposed 1 inch from said opening.

13. The apparatus as set forth in claim 7, having means for flexibly securing said extractor to a wall of said tank.

14. The apparatus as set forth in claim 13, said securing means comprising a positioning member.

15. The apparatus as set forth in claim 14, said longitudinal positioning member comprising relative rigid sections; flexible, expansible joints interconnecting said sections so as to permit limited substantially vertical movement of said extractor.

16. The apparatus as set forth in claim 14, wherein said sections include relatively rigid parallel members.

17. The apparatus as set forth in claim 16, wherein a first section has an end thereof attached to the wall of said tank, and a third support section attached at opposite sides of said extractor so as to inhibit lateral movement of said extractor.

18. The apparatus as set forth in claim 7, having means for bouyantly positioning said extractor relative to said upper fluid level.

19. The apparatus as set forth in claim 7, wherein said extractor is located to one side of the longitudinal axis of said chamber.

20. The apparatus as set forth in claim 19, with means attached to the top and said walls, respectively, of said tank for inhibiting movement of said extractor towards the longitudinal axis of said chamber.

21. The apparatus as set forth in claim 7, wherein the safety valve is provided near the top of said tank to limit the upper level of slurry in said tank.

22. The apparatus as set forth in claim 7, having cutoff means; said cutoff means being attached to said extractor, and positioned to sense the approach of the extractor to the bottom of said tank; said cutoff means causing fluid medium to be added to the tank to prevent burn up of the pump.

23. The apparatus as set forth in claim 1, with said quiescent zone being located to one side of the longitudinal axis of said chamber.

24. The apparatus as set forth in claim 1, wherein a predetermined quantity of said fluid medium is added to said quiescent zone, so as to dilute said slurry therein prior to removal.

25. The apparatus as set forth in claim 1, wherein the safety valve is provided near the top of said tank to limit the upper level of slurry in said tank.

* * * * *